(12) United States Patent
Choi et al.

(10) Patent No.: US 8,295,424 B2
(45) Date of Patent: Oct. 23, 2012

(54) DATA RECEIVING APPARATUS AND METHOD

(75) Inventors: Woo Jae Choi, Dongjak-gu (KR); Sang Ho Woo, Gangbuk-gu (KR); Mi Youn Kim, Suwon-si (KR)

(73) Assignee: Dongbu HiTek Co., Ltd., Seoul (KR)

( * ) Notice: Subject to any disclaimer, the term of this patent is extended or adjusted under 35 U.S.C. 154(b) by 359 days.

(21) Appl. No.: 12/649,142

(22) Filed: Dec. 29, 2009

(65) Prior Publication Data

US 2010/0166117 A1 Jul. 1, 2010

(30) Foreign Application Priority Data

Dec. 30, 2008 (KR) .................. 10-2008-0136908

(51) Int. Cl.
*H04L 23/00* (2006.01)

(52) U.S. Cl. ........... 375/377; 327/50; 327/108; 327/165

(58) Field of Classification Search .................. 375/286, 375/340, 316, 326, 377; 327/63, 103, 50–56, 327/108, 165
See application file for complete search history.

(56) References Cited

U.S. PATENT DOCUMENTS

| 6,392,446 | B1* | 5/2002 | Reasoner et al. | 327/20 |
|---|---|---|---|---|
| 7,876,130 | B2* | 1/2011 | Lee et al. | 326/82 |
| 2004/0004498 | A1* | 1/2004 | Nakao | 326/95 |
| 2006/0245508 | A1* | 11/2006 | Takamuku | 375/257 |
| 2007/0182690 | A1* | 8/2007 | Lin | 345/100 |
| 2008/0022144 | A1* | 1/2008 | Shibata et al. | 713/502 |
| 2008/0100347 | A1* | 5/2008 | Uchiki | 327/52 |
| 2008/0246755 | A1* | 10/2008 | Lee | 345/214 |

\* cited by examiner

*Primary Examiner* — Jean B Corrielus
(74) *Attorney, Agent, or Firm* — Sherr & Jiang, PLLC

(57) ABSTRACT

A data receiving apparatus and method includes a current-voltage conversion block, which receives a current-type transmit signal including data and a clock signal inserted into the data at a different level from the data, and then converts the received signal into at least one first voltage and at least one second voltage having a different level from the first voltage, and a comparison block, which makes a comparison between the first and second voltages, and then outputs the received signal as one of the data and the clock signal based on a result of the comparison. The data receiving apparatus can easily recover a clock signal while exhibiting better characteristics during the recovery of the clock signal because it is insensitive to a variation in reference voltage and a variation in current at the transmitting state of the timing controller, which are caused by a process variation.

16 Claims, 7 Drawing Sheets

DATA RECEIVING APPARATUS AND METHOD

The present application claims priority under 35 U.S.C. 119 to Korean Patent Application No. 10-2008-0136908 (filed on Dec. 30, 2009), which is hereby incorporated by reference in its entirety.

BACKGROUND

A data transmitting/receiving apparatus will be described with reference to the accompanying drawings. FIG. 1 is a schematic view illustrating a display having a related data transmitting/receiving apparatus. Referring to FIG. 1, a timing controller 2 may be a data transmitter, and a source driver (or a column driver) 4 may be a data receiver.

A reduced swing differential signaling (RSDS) system or a mini-low voltage differential signaling (mini-LVDS) system may be used for an interface between a timing controller and a source driver. However, the features of either the RSDS system or the mini-LVDS system, namely, the feature of converting a current into a voltage using a termination resistor at the side of a data receiver and the feature of transmitting a signal from a data transmitter to the data receiver in a multi-drop manner, incur many problems in an LCD device, which includes a panel exhibiting a high resolution while having a large area. This is because an increase in data transmission rate and an increase in the number of signal lines occur, so that the system becomes complicated. In the multi-drop mode, it is difficult to secure a desired signal transmission quality because a source driver is shared among all signal lines. Furthermore, use of a clock signal having a high frequency causes high electromagnetic interference (EMI). In order to overcome the above-mentioned problems, an advanced intra panel interface (AiPi) has been proposed. The basic concept of the AiPi interface is to adopt driving in a point-to-point mode, in place of driving in the multi-drop mode. The feature of this system is to introduce the concept of embedding a clock line in a data line, in order to reduce the number of signal lines while eliminating skew of data and signal lines.

FIG. 2 is a waveform diagram of a transmit signal explaining the concept of embedding a clock signal in data. As shown in FIG. 2, a data line is swung among multiple levels to discriminate data and a clock signal from each other. A data receiver, which receives the transmit signal shown in FIG. 2, uses reference voltages Vrefh and Vrefl, in order to discriminate data and the clock signal contained in the transmit signal. In accordance with this system, it is possible to reduce the number of signals, and to use a low operation frequency. Accordingly, there is an advantage in terms of costs. In addition, superior characteristics are exhibited in terms of EMI or signal quality, as compared to the RSDS or mini-LVDS system. However, the AiPi interface has a problem in terms of signal recovery. That is, the reference voltages Vrefh and Vrefl used to discriminate data and a clock signal from each other are generated in a source driver. Also, conversion of current to voltage is carried out using a termination resistor. For this reason, there is a problem in that, when variations in reference voltages Vrefh and Vrefl occur in a direction opposite to a variation in current in the data transmitter, namely, the timing controller, it is impossible to discriminate data and a clock signal from each other, so that it is impossible to recover a desired signal. Thus, the system, in which data and a clock signal are discriminated using the reference voltages, has a problem in that it is sensitive to variations in current and voltage.

FIG. 3 is a diagram schematically illustrating a timing controller 10 and a source driver 20. Referring to FIG. 3, a clock signal output from a clock driver 12 and data output from a data driver 14 are synthesized in a synthesizer 16. The synthesized signal is transmitted from the timing controller 10 to the source driver 20. The source driver 20 converts the synthesized signal into a voltage, using a termination resistor R1, compares the voltage with reference voltages, and separates the clock signal and data from the voltage signal in accordance with the result of the comparison.

When the resistances of signal lines between the timing controller 10 and the source driver 20 are increased in the case in which a current is converted into a voltage using the termination resistor R1, as shown in FIG. 3, it is difficult to achieve signal recovery due to voltage drop occurring across resistors RL1 and RL2 formed by the resistances of the signal lines. In particular, the AiPi interface system has a problem in that signal recovery is more difficult because the current at the transmitting stage of the timing controller 10 is higher than data, for the generation of the clock signal, in the AiPi interface system, as shown in FIG. 2.

In a panel having a size of 12.1 inches or less such as a notebook, a chip-on-glass (COG) structure is used, in place of a bonding structure using a related chip-on film (COF) or a related tape carrier package (TCP), in order to achieve an enhancement in price competitiveness. In the COG structure, a chip is bonded to a glass without using a tape. In this case, a flexible printed circuit board (FPC) is used to connect power and control signals between a control board and a driver. In order to reduce the area of the FPC, and thus to achieve an enhancement in price competitiveness, power and signal lines are also patterned the glass. However, the signal lines formed on the glass exhibit an increased resistance, as compared to a printed circuit board (PCB). For this reason, there is a difficulty in driving the LCD panel using the COG structure in currently-used interface systems such as the RSDS, mini-LVDS, and AiPi systems.

SUMMARY

Embodiments relate to data signal processing, and more particularly, to a data receiving apparatus and method configured to receive a transmit signal containing a clock signal and data, and to recover the clock signal and data. Embodiments relate to a data receiving apparatus and method capable of recovering a clock signal when the clock signal is inserted into data at a different level from the data, and achieving driving with low power.

Embodiments relate to an apparatus for receiving data which may include a current-voltage conversion block, which receives a current-type transmit signal including data and a clock signal inserted into the data at a different level from the data, and then converts the received signal into at least one first voltage and at least one second voltage having a different level from the first voltage, and a comparison block, which makes a comparison between the first and second voltages, and then outputs the received signal as one of the data and the clock signal based on a result of the comparison.

Embodiments relate to a method for receiving data which may include receiving a current-type transmit signal including data and a clock signal inserted into the data at a different level from the data, converting the received signal into at least one first voltage while converting the received signal into at least one second voltage having a different level from the first voltage, and comparing the first voltage and the second voltage, and outputting the received signal as one of the data and the clock signal based on a result of the comparison.

DRAWINGS

Figure 1:
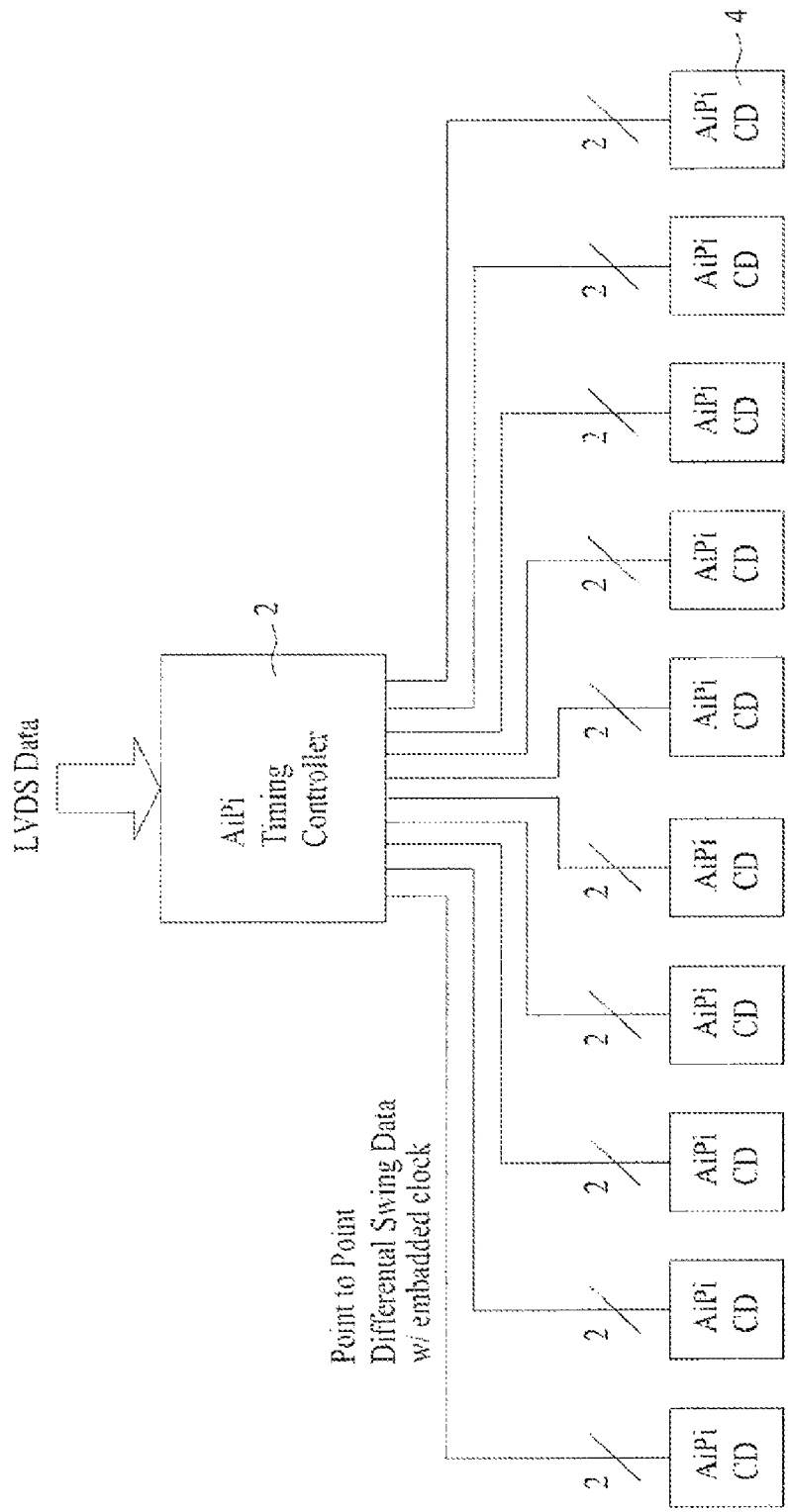
FIG. 1 is a schematic view illustrating a display having a related data transmitting/receiving apparatus.
Figure 2:
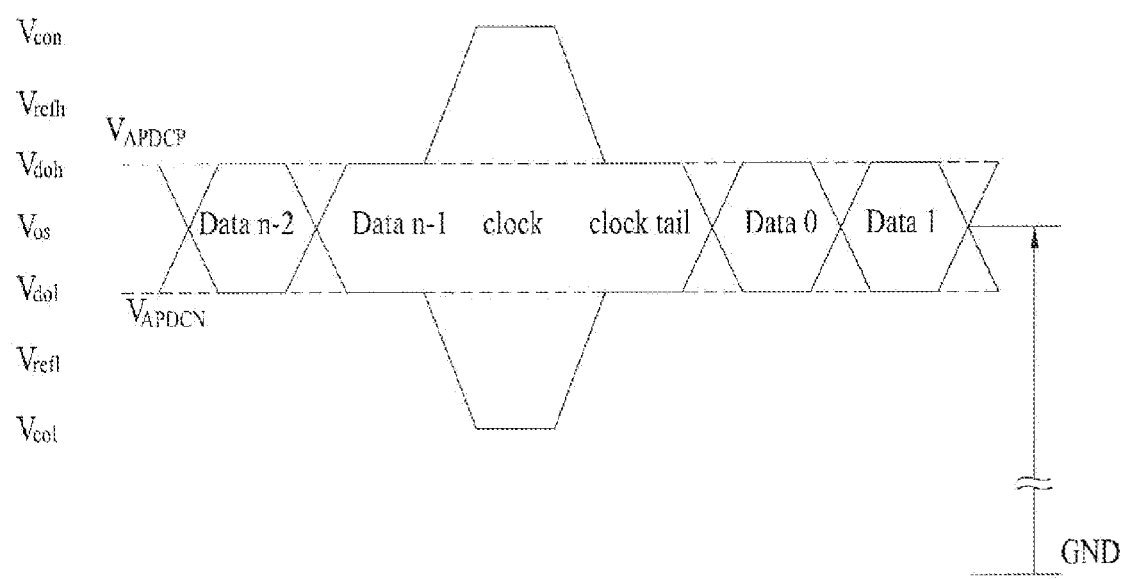
FIG. 2 is a waveform diagram of a transmit signal explaining the concept of embedding a clock signal in data.
Figure 3:
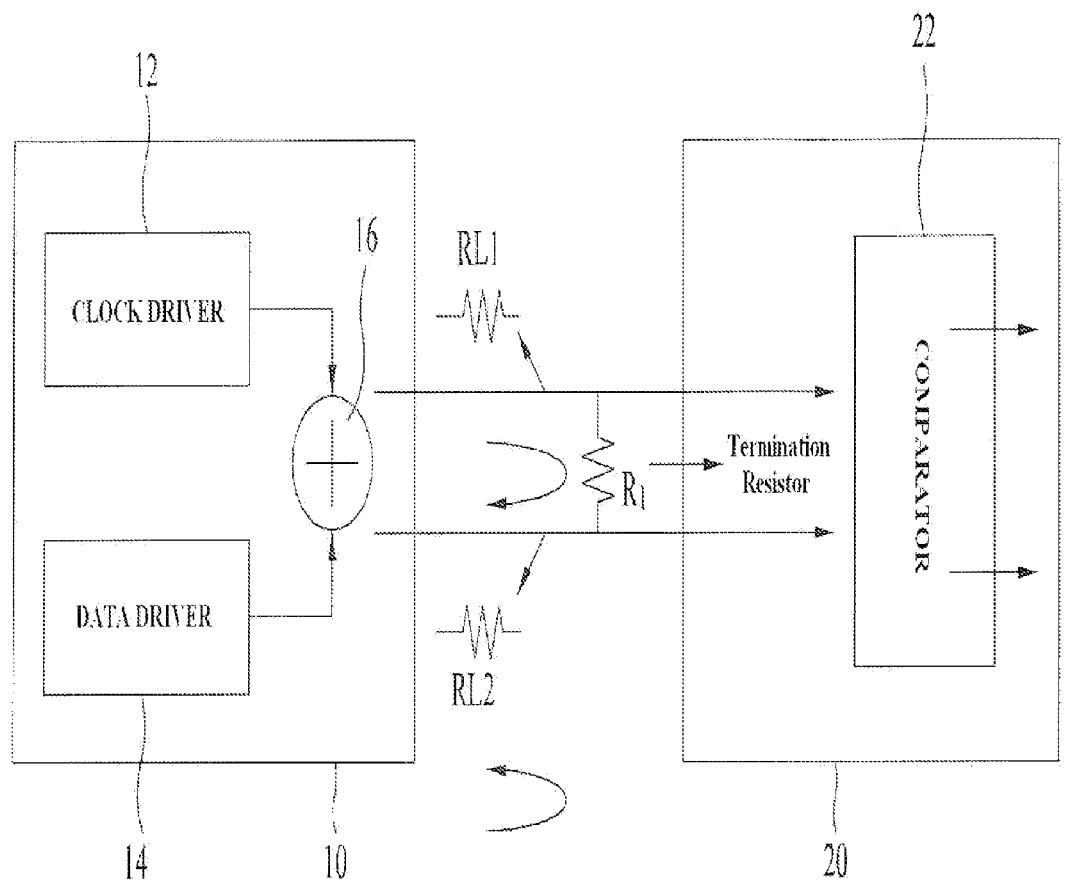
FIG. 3 is a diagram schematically illustrating a timing controller and a source driver.
Figure 4:
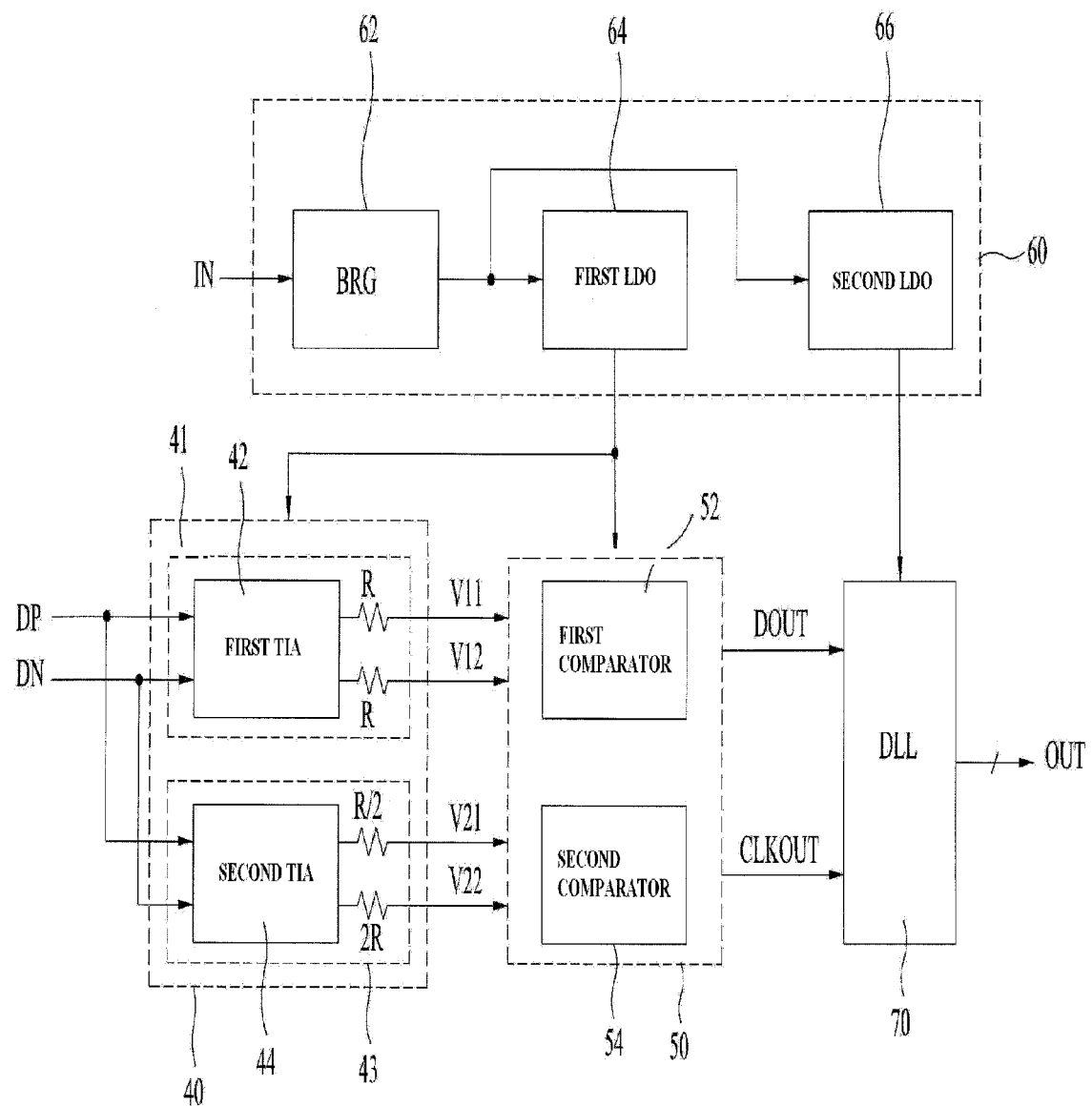

Example FIG. 4 is a block diagram of a data receiving apparatus according to embodiments.

Figure 5:
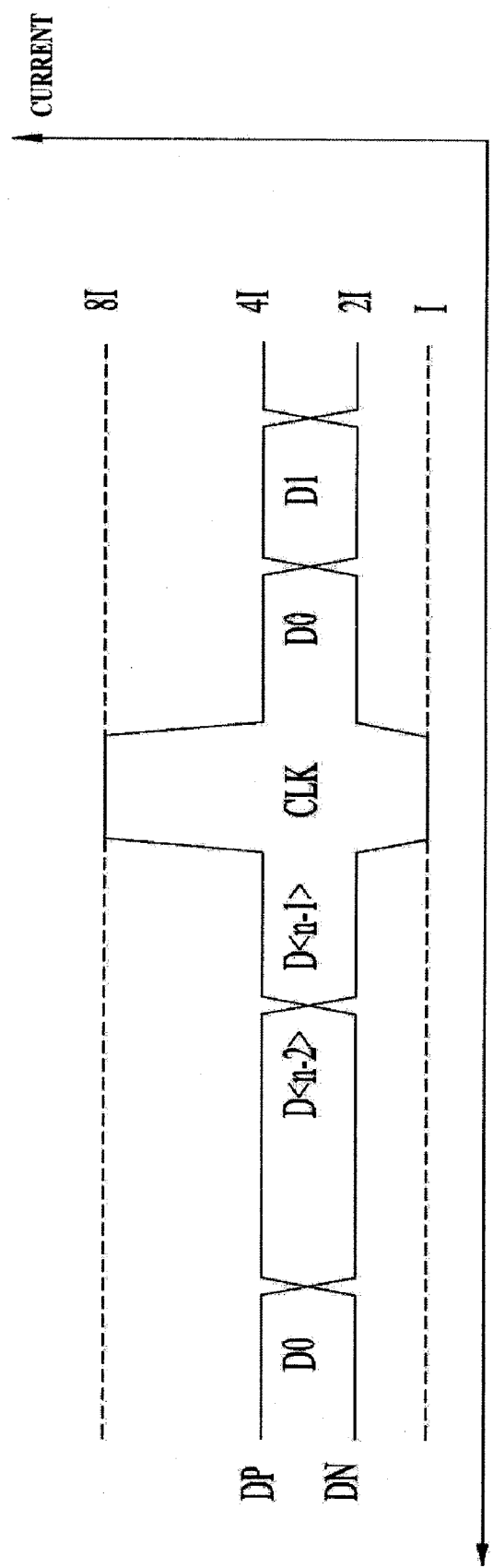

Example FIG. 5 is a current waveform diagram of a transmit signal received by the data receiving apparatus shown in example FIG. 4.

Figure 6:
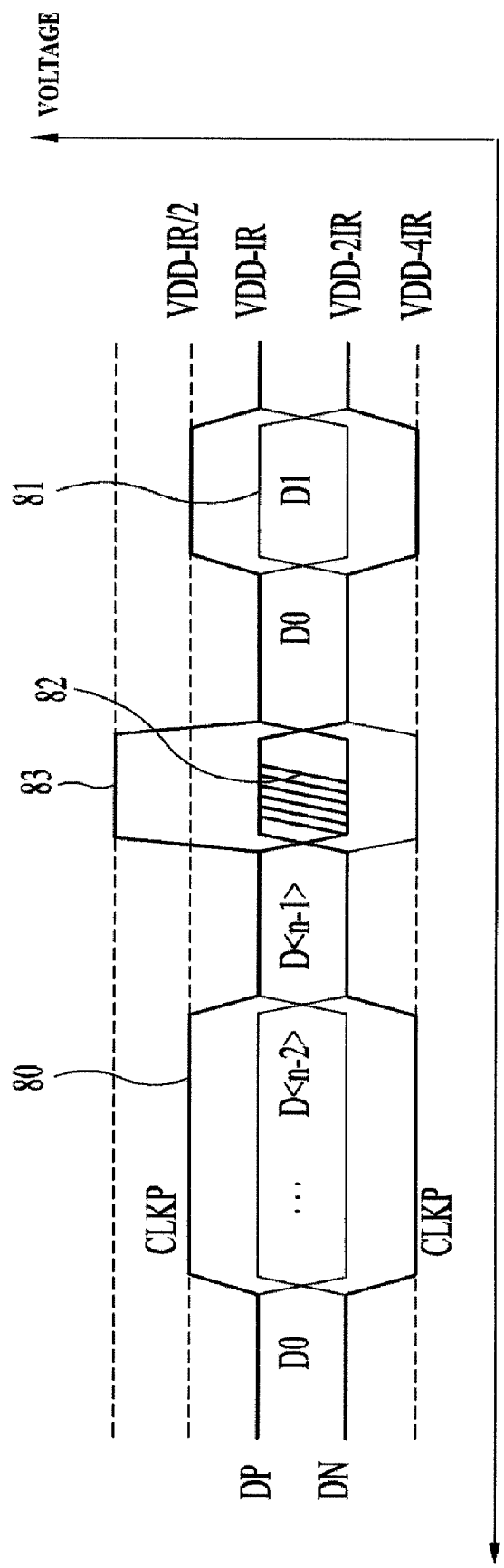

Example FIG. 6 is a waveform diagram illustrating the waveform of a voltage output from a current-voltage conversion block shown in example FIG. 4.

Figure 7:
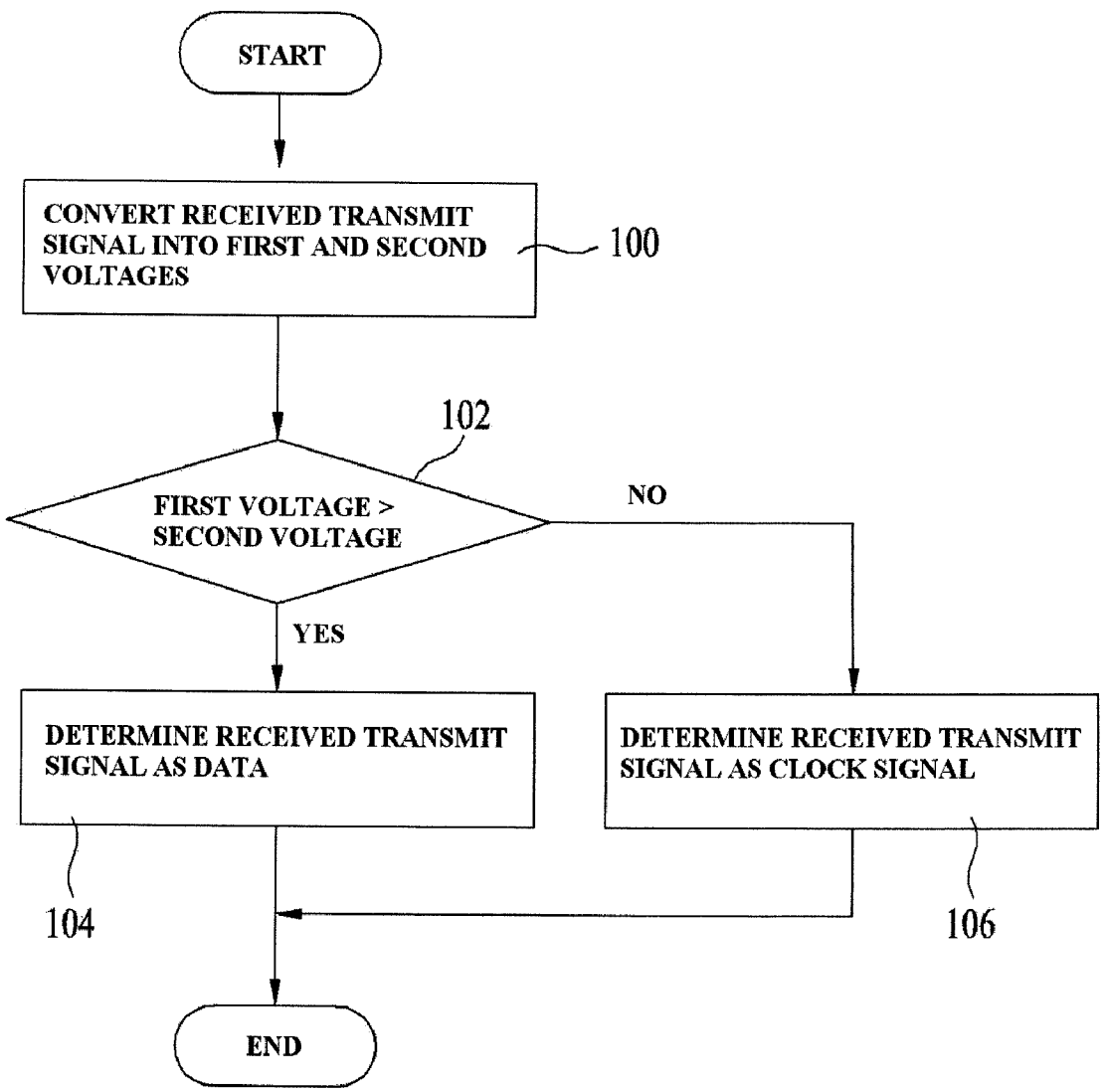

Example FIG. 7 is a flow chart explaining a data receiving method according to embodiments.

DESCRIPTION

Hereinafter, a data receiving apparatus according to embodiments will be described with reference to the accompanying drawings.

Example FIG. 4 is a block diagram of a data receiving apparatus according to embodiments. The data receiving apparatus includes a current-voltage conversion block 40, a comparison block 50, a power supply unit 60, and a delay-locked loop (DLL) 70.

Example FIG. 5 is a current waveform diagram of a transmit signal received by the data receiving apparatus shown in example FIG. 4. In example FIG. 5, "I" represents current.

The current-voltage conversion block 40 shown in example FIG. 4 receives a current-type transmit signal in which a clock signal CLK is inserted into data at a different level from data signals D0, . . . , D<n−2>, and D<n−1> included in the data, as shown in example FIG. 5. For example, a data transmitting apparatus, which functions to transmit the transmit signal, may correspond to a timing controller (not shown) in a display. In this case, the data receiving apparatus of example FIG. 4, which functions to receive the transmit signal transmitted from the timing controller, may correspond to a source driver of the display. The timing controller transmits data to the source driver, thereby causing the source driver to drive a display panel (not shown).

Referring to example FIG. 5, it can be seen that both the data and clock signal have a differential type. The transmit signal has, per unit bit, a DP and a DN which are paired with each other. The DP represents a positive one of differential data, whereas the DN represents a negative one of differential data. It is determined whether data has a high level or a low level in accordance with whether one of the DP and DN of the data has a current value higher or lower than the other one of the DP and DN.

The current-voltage conversion block 40 converts the received transmit signal into at least one first voltage. The current-voltage conversion block 40 also converts the received transmit signal into at least one second voltage having a different level from the first voltage. The current-voltage conversion block 40 outputs the converted results to the comparison block 50.

In accordance with embodiments, the current-voltage conversion block 40 may include first and second current-voltage converters 41 and 43.

The first current-voltage converter 41 outputs a plurality of first voltages corresponding to the levels of the received transmit signal, for example, two first voltages V11 and V12. The second current-voltage converter 43 outputs a plurality of second voltages corresponding to the levels of the received transmit signal, but having different levels from the first voltages, for example, two second voltages V21 and V22.

For example, the first current-voltage converter 41 includes a first trans-impedance amplifier (TIA) 42, and two first resistors R1. The first TIA 42 converts the current-type transmit signal into a voltage. At this time, the voltage converted from the current is amplified by virtue of the characteristics of the TIA. Each of the two first resistors R1 is connected between the output of the first TIA 42 and an associated one of the first voltages V11 and V12. The first resistors R1 have a resistance of "R". The voltages amplified by the first TIA 42 are output to the comparison block 50 after being dropped by the first resistors R1.

The second current-voltage converter 43 includes a second TIA 44, a second resistor R2, and a third resistor R3. Similarly to the first TIA 42, the second TIA 44 converts the current-type transmit signal into a voltage, and amplifies the voltage. The second resistor R2 is connected to the output of the second TIA 44, and has a lower resistance than the first resistor R1. For example, the second resistor R2 may have a resistance of "R/2". The third resistor R3 is connected to the output of the second TIA 44, and may have a resistance of "2R".

The comparison block 50 compares the first voltage V11 and/or first voltage V12 with the second voltage V21 and/or second voltage V22, and outputs the result of the comparison as data DOUT or a clock signal CLKOUT. For example, when the first voltage V11 and/or first voltage V12 is higher than the second voltage V21 and/or second voltage V22, the comparison block 50 outputs the received transmit signal as the data DOUT. On the other hand, when the first voltage V11 and/or first voltage V12 is lower than the second voltage V21 and/or second voltage V22, the comparison block 50 outputs the received transmit signal as the clock signal CLKOUT. The comparison block 50 performs a function of converting a low-level signal into a CMOS voltage.

For example, the comparison block 50 may include first and second comparators 52 and 54. In this case, the first comparator 52 compares the first voltage V11 and/or first voltage V12 with the second voltage V21 and/or second voltage V22, whereas the second comparator 54 compares the second voltage V21 and/or second voltage V22 with the first voltage V11 and/or first voltage V12.

In accordance with embodiments, the recovered data DOUT may be output from the first comparator 52, whereas the recovered clock signal CLKOUT may be output from the second comparator 54.

In accordance with embodiments, the recovered data DOUT may be output from the first and second comparators 52 and 54, and the comparison results obtained in the first and second comparators 52 and 54 may be logically combined in a logical combiner (not shown) which, in turn, outputs the result of the logical combination as the clock signal CLKOUT.

Meanwhile, the data receiving apparatus according to the illustrated embodiments may further include the DLL 70. The DLL 70 delays the clock signal CLKOUT received from the comparison block 50 for different times, to generate a plurality of recovered clock signals, respectively. The DLL 70 then inserts the recovered clock signals into the data DOUT at intervals of several bits, to achieve signal recovery. The recovered signal is output from the DLL 70 through an output terminal OUT.

The data receiving apparatus according to the illustrated embodiments may further include the power supply unit 60. The power supply unit 60 adjusts the level of an external supply voltage input through an input terminal IN, and outputs a level-adjusted internal supply voltage as a supply voltage VDD for the current-voltage conversion block 40, comparison block 50, and DLL 70.

For this function, the power supply unit 60 includes a bandgap reference voltage generator (BGR) 62, and at least one voltage regulator. In the illustrated case, the power supply unit 60 includes two voltage regulators 64 and 66. The BGR 62 receives the external supply voltage input through the input terminal IN, and generates a reference voltage, based on the received external supply voltage. The reference voltage is a voltage having a constant level without being influenced by external environment, for example, supply voltage, temperature, process parameters, etc.

Each of the voltage regulators 64 and 66 adjusts the level of the reference voltage received from the BGR 62, and outputs the adjusted result, as an internal supply voltage, to the units 40, 50, and 70. Although there are two voltage regulators 64 and 66 in the case illustrated in example FIG. 4, a reduced or increased number of voltage regulators may be used. Meanwhile, each of the voltage regulators 64 and 66 may be a low drop-out (LDO) regulator.

Hereinafter, the data receiving apparatus having the above-described configuration according to the illustrated embodiments will be described.

Example FIG. 6 is a waveform diagram illustrating the waveform of a voltage output from the current-voltage conversion block 40 shown in example FIG. 4.

Referring to example FIG. 5, it can be seen that the "high" and "low" levels of an input current corresponding to data are 4I and 2I, respectively. The positive and negative components of the transmit signal, namely, DP and DN, are connected to each of the first and second TIAs 42 and 44. Accordingly, half of the current amount of the positive component DP in the transmit signal is input to each of the first and second TIAs 42 and 44, and half of the current amount of the negative component DN in the transmit signal is input to each of the first and second TIAs 42 and 44. Thus, the current amounts input to each of the first and second TIAs 42 and 44 are DP/2 and DN/2, respectively. In the case of, for example, example FIG. 5, currents 2I and I are input to each of the first and second TIAs 42 and 44 when the received transmit signal is data because the DP and DN of the transmit signal are 4I and 2I, respectively. On the other hand, when the received transmit signal is a clock signal CLK, currents 4I and I/2 are input to each of the first and second TIAs 42 and 44 because the DP and DN of the transmit signal are 8I and I, respectively.

First, the first and second voltages output from the first and second TIAs 42 and 44 when the received transmit signal is data will be described.

The current I input to the first TIA 42 is converted into a first voltage V11 having a level of "VDD-IR", whereas the current 2I input to the first TIA 42 is converted into a first voltage V12 having a level of "VDD-2IR". The first voltages V11 and V12 generated when data is input through the received transmit signal have waveforms 81 as shown in example FIG. 6.

On the other hand, the current I input to the second TIA 44 is converted into a second voltage V21 having a level of "VDD-IR/2", whereas the current I input to the second TIA 44 is converted into a second voltage V22 having a level of "VDD-2IR". The second voltages V21 and V22 generated when data is input through the received transmit signal have waveforms 80 as shown in example FIG. 6.

Next, the first and second voltages output from the first and second TIAs 42 and 44 when the received transmit signal is a clock signal CLK will be described.

The current 4I input to the first TIA 42 is converted into a first voltage V11 having a level of "VDD-4IR", whereas the current I/2 input to the first TIA 42 is converted into a first voltage V12 having a level of "VDD-IR/2". The first voltages V11 and V12 generated when a clock signal is input through the received transmit signal have waveforms 83 as shown in example FIG. 6.

On the other hand, the current 4I input to the second TIA 44 is converted into a second voltage V21 having a level of "VDD-2IR", whereas the current I/2 input to the second TIA 44 is converted into a second voltage V22 having a level of "VDD-IR". The second voltages V21 and V22 generated when data is input through the received transmit signal have waveforms 82 as shown in example FIG. 6.

Thus, when data is input through the received transmit signal, the first voltages output from the first TIA 42 are higher than the second voltages output from the second TIA 44, irrespective of whether the level of the data is a "high" level or a "low" level. On the other hand, when a clock signal is input through the received transmit signal, the first voltages output from the first TIA 42 are always lower than the second voltages output from the second TIA 44.

As apparent from the above description, the data receiving apparatus according to the illustrated embodiments can discriminate whether the received transmit signal is data or a clock signal by comparing the first voltages output from the first TIA 42 and the second voltages output from the second TIA 44, without using a reference voltage.

Hereinafter, a data receiving method according to embodiments will be described with reference to the accompanying drawings.

Example FIG. 7 is a flow chart explaining a data receiving method according to embodiments.

Referring to example FIG. 7, a current-type transmit signal, in which a clock signal CLK is inserted into data at a different level from data signals included in the data, as shown in example FIG. 5, is received (100). The received transmit signal is then converted into at least one first voltage. The received transmit signal is also converted into at least one second voltage having a different level from the first voltage (100).

After execution of step 100, it is determined whether the first voltage is higher than the second voltage (102).

If the first voltage is higher than the second voltage, the received transmit signal is determined as data DOUT (104). However, if the first voltage is lower than the second voltage, the received transmit signal is determined as a clock signal CLKOUT.

In order to convert a current-type transmit signal into a voltage after receiving the transmit signal, the data receiving apparatus according to embodiments uses two TIAs, different from the related interface system, which uses a termination resistor. Accordingly, even when the level of the current transmitted from the transmitting side is low, it is possible to easily recover the transmit signal, which has a low level, because the current is amplified when it is converted into a voltage. That is, a desired signal recovery can be achieved even when the current amount of the transmit signal is small, different from the related data receiving apparatus. Although the driving current used in the RSDS or mini-LVDS system normally has a level of 2 mA, the driving current used in the data receiving apparatus according to embodiments may have a level of 100 to 200 μA. In addition, in the data receiving apparatus according to embodiments, there is no signal distortion caused by voltage drop (IR-drop) generated due to the resistances RL1 and RL2 of the signal lines. If the transmit signal is transmitted from a timing controller, and the data receiving apparatus according to embodiments is a source driver, the data receiving apparatus is insensitive to the characteristics of the signal lines between the timing controller and the source driver.

Also, the first and second voltage regulators 64 and 66, namely, the first and second LDOs, supply power to each unit, using an internal supply voltage in place of an external supply voltage, in order to achieve stable operation of the data receiving apparatus shown in example FIG. 4. Accordingly, it is possible to further improve the characteristics of the data receiving apparatus by the first and second LDOs 64 and 66.

Since the swing level of the clock signal is equal to the swing level of the data, it is possible to solve a skew problem caused by a swing level difference. That is, it is possible to eliminate a phenomenon in which it is difficult to achieve signal recovery due to a skew between the data and the clock signal. For data preceding and following the clock signal to be recovered, dummy data may be used, in place of actual data.

Since the clock signal and data can be recovered in accordance with the results of comparison between the first and second voltages, it is unnecessary to use a separate reference voltage for discriminating the clock signal and data from each other. Thus, there is no characteristic sensitive to a variation in reference voltage and a variation in current at the transmitting stage of the timing controller. Also, signal recovery can be more easily achieved.

Consequently, the data receiving apparatus according to embodiments is suitable for a high-resolution panel having a large size. Also, the data receiving apparatus is applicable to a notebook panel using a COG structure without a problem. Thus, the data receiving apparatus can be used for most LCD panels.

As apparent from the above description, the data receiving apparatus and method according to embodiments can easily recover a clock signal while exhibiting better characteristics during the recovery of the clock signal because they are insensitive to a variation in reference voltage and a variation in current at the transmitting state of the timing controller, which are caused by a process variation, in that no reference voltage is used to recover the clock signal. It is also possible to eliminate a phenomenon in which signal recovery is difficult due to a skew between the data and the clock signal. Also, low-power driving can be achieved because TIAs are used for conversion of a current-type transmit signal into a voltage. That is, although the current transmitted from the transmitting side has a low level, it is amplified during the conversion thereof into a voltage. Accordingly, it is possible to easily recover the transmit signal, which has a low level. Since the data receiving apparatus is also not sensitive to the resistances of signal lines, and an internal supply voltage is used, in place of an external supply voltage, it is possible to further improve the characteristics of the data receiving apparatus.

It will be obvious and apparent to those skilled in the art that various modifications and variations can be made in the embodiments disclosed. Thus, it is intended that the disclosed embodiments cover the obvious and apparent modifications and variations, provided that they are within the scope of the appended claims and their equivalents.

What is claimed is:

1. An apparatus comprising:
   a current-voltage conversion block, which receives a current-type transmit signal, including data and a clock signal inserted into the data at a different level from the data, and then converts the received signal into at least one first voltage and at least one second voltage having a different level from the first voltage;
   a comparison block, which makes a comparison between the first and second voltages, and then outputs the received signal as one of the data and the clock signal based on a result of the comparison,
   wherein the current-voltage conversion block includes:
   a first current-voltage converter, which outputs a plurality of first voltages corresponding to a level of the received signal; and
   a second current-voltage converter, which outputs a plurality of second voltages each having a different level from the first voltages.

2. The apparatus of claim 1, including a power supply unit, which adjusts a level of an external supply voltage, wherein the power supply unit outputs an internal supply voltage corresponding to the level-adjusted external supply voltage, as a supply voltage for the current-voltage conversion block and the comparison block.

3. The apparatus of claim 2, wherein the power supply unit includes a bandgap reference voltage generator, which receives the external supply voltage, and then outputs a reference voltage.

4. The apparatus of claim 3, wherein the power supply unit includes at least one voltage regulator, which adjusts a level of the reference voltage, and then outputs the level-adjusted reference voltage as the internal voltage.

5. The apparatus of claim 4, wherein the voltage regulator comprises a low drop-out regulator.

6. The apparatus of claim 1, wherein the first current-voltage converter includes a first trans-impedance amplifier, which amplifies the received signal.

7. The apparatus of claim 6, wherein the first current-voltage converter includes first resistors, each of which is connected in parallel between an output node of the first trans-impedance amplifier and a node for outputting an associated one of the first voltages.

8. The apparatus of claim 7, wherein the second current-voltage converter includes a second trans-impedance amplifier, which amplifies the received signal.

9. The apparatus of claim 8, wherein the second current-voltage converter includes a second resistor, which is connected to an output node of the second trans-impedance amplifier, and has a lower resistance than the first resistors.

10. The apparatus of claim 9, wherein the second current-voltage converter includes a third resistor, which is connected to the output node of the second trans-impedance amplifier, and has a higher resistance than the first resistors.

11. The apparatus of claim 1, wherein the comparison block includes a first comparator, which compares the first and second voltages to determine whether the first voltage is higher than the second voltage.

12. The apparatus of claim 11, wherein the comparison block includes a second comparator, which compares the first and second voltages to determine whether the second voltage is higher than the first voltage.

13. The apparatus of claim 1, including a delay-locked loop, which delays the clock signal received from the comparison block for different times.

14. The apparatus of claim 13, wherein the delay-locked loop further generates a plurality of recovered clock signals, inserts the recovered clock signals into the data received from the comparison block, and outputs the resultant signal.

15. A method comprising:
receiving a current-type transmit signal including data and a clock signal inserted into the data at a different level from the data;
converting the received signal into at least one first voltage, and converting the received signal into at least one second voltage having a different level from the first voltage;
comparing the first voltage and the second voltage, and outputting the received signal as one of the data and the clock signal based on a result of the comparison, wherein the outputting of one of the data and the clock signal includes outputting the received transmit signal as the data when the first voltage is higher than the second voltage.

16. The method of claim 15, wherein the outputting of one of the data and the clock signal includes outputting the received transmit signal as the clock signal when the first voltage is lower than the second voltage.

* * * * *